US009613032B2

(12) United States Patent
Sadovsky et al.

(10) Patent No.: US 9,613,032 B2
(45) Date of Patent: *Apr. 4, 2017

(54) REGISTERING, TRANSFERRING, AND ACTING ON EVENT METADATA

(75) Inventors: Vladimir Sadovsky, Bellevue, WA (US); Mysore Y. Jaisimha, Kenmore, WA (US); Oren Rosenbloom, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/340,216

(22) Filed: Dec. 29, 2011

(65) Prior Publication Data

US 2012/0096110 A1    Apr. 19, 2012

Related U.S. Application Data

(63) Continuation of application No. 11/379,031, filed on Apr. 17, 2006, now Pat. No. 8,117,246.

(51) Int. Cl.
*G06F 7/00*    (2006.01)
*G06F 17/30*    (2006.01)
*G06F 17/00*    (2006.01)

(52) U.S. Cl.
CPC .............................. *G06F 17/30035* (2013.01)

(58) Field of Classification Search
USPC ....... 707/899, 104, 803; 725/46, 61; 705/59; 379/88.14; 370/260; 715/744
See application file for complete search history.

(56) References Cited

U.S. PATENT DOCUMENTS 5,966,135 A    10/1999    Roy et al.
6,084,952 A    7/2000    Beerman, Jr. et al.
(Continued)

FOREIGN PATENT DOCUMENTS

CN    1520659 A    8/2004
CN    1600002 A    3/2005
(Continued)

OTHER PUBLICATIONS

U.S. Appl. No. 11/192,510, entitled, "Strategies for Queuing Events for Subsequent Processing," filed Jul. 29, 2005, naming the inventors of James H. Dooley, Jason S. Flaks, Mukul Gupta, Sean D. Kelly, and Charles Alan Ludwig, 38 pages.
(Continued)

*Primary Examiner* — Susan Chen
(74) *Attorney, Agent, or Firm* — Jacob P. Rohwer; Newport IP, LLC

(57) ABSTRACT

A technique and associated mechanism is described for registering event metadata at a first site, transferring the event metadata to a second site using a portable module, and processing the event metadata at the second site. A user can register the event metadata at the first site in the course of consuming broadcast content. Namely, when the user encounters an interesting portion of the broadcast content, the user activates an input mechanism, resulting in the storage of event metadata associated with the interesting portion on the portable module. The second site can upload the event metadata from the portable module and, in response, provide content associated with the event metadata, including recommended content associated with the event metadata.

19 Claims, 11 Drawing Sheets

(56) References Cited

U.S. PATENT DOCUMENTS

| | | |
|---|---|---|
| 6,119,167 A | 9/2000 | Boyle et al. |
| 6,192,415 B1 | 2/2001 | Haverstock et al. |
| 6,366,296 B1 | 4/2002 | Boreczky et al. |
| 6,411,685 B1 * | 6/2002 | O'Neal ...................... 379/88.14 |
| 6,430,624 B1 | 8/2002 | Jamtgaard et al. |
| 6,564,257 B1 | 5/2003 | Emens et al. |
| 6,643,650 B1 | 11/2003 | Slaughter et al. |
| 6,670,971 B1 | 12/2003 | Oral |
| 6,728,775 B1 | 4/2004 | Chaddha |
| 6,760,916 B2 | 7/2004 | Holtz et al. |
| 6,839,748 B1 | 1/2005 | Allavarpu et al. |
| 6,850,603 B1 | 2/2005 | Eberle et al. |
| 6,873,693 B1 | 3/2005 | Langseth et al. |
| 6,910,068 B2 | 6/2005 | Zintel et al. |
| 6,925,483 B1 | 8/2005 | Niemi |
| 6,964,012 B1 | 11/2005 | Zirngibl et al. |
| 7,047,241 B1 * | 5/2006 | Erickson |
| 7,120,585 B2 | 10/2006 | Boulanov |
| 7,149,755 B2 | 12/2006 | Obrador |
| 7,493,341 B2 * | 2/2009 | Israel et al. |
| 7,599,580 B2 | 10/2009 | King et al. |
| 7,626,950 B2 * | 12/2009 | Wright et al. ................. 370/260 |
| 8,022,942 B2 * | 9/2011 | Bathiche et al. ............. 345/176 |
| 8,117,246 B2 * | 2/2012 | Sadovsky et al. ............ 707/899 |
| 2002/0010759 A1 | 1/2002 | Hitson et al. |
| 2002/0027569 A1 | 3/2002 | Manni et al. |
| 2002/0029256 A1 | 3/2002 | Zintel et al. |
| 2002/0077988 A1 * | 6/2002 | Sasaki et al. ................... 705/59 |
| 2002/0092019 A1 | 7/2002 | Marcus |
| 2002/0120577 A1 | 8/2002 | Hans et al. |
| 2002/0161755 A1 | 10/2002 | Moriarty |
| 2002/0161884 A1 | 10/2002 | Munger et al. |
| 2002/0168082 A1 * | 11/2002 | Razdan .......................... 382/100 |
| 2002/0170068 A1 | 11/2002 | Rafey et al. |
| 2002/0174425 A1 | 11/2002 | Markel et al. |
| 2002/0194604 A1 | 12/2002 | Sanchez et al. |
| 2003/0005130 A1 | 1/2003 | Cheng |
| 2003/0097338 A1 | 5/2003 | Mankovich et al. |
| 2003/0101230 A1 | 5/2003 | Benschoter et al. |
| 2003/0110298 A1 | 6/2003 | Lanigan |
| 2003/0110507 A1 | 6/2003 | Dimitrova et al. |
| 2003/0117433 A1 | 6/2003 | Milton et al. |
| 2003/0135576 A1 | 7/2003 | Bodin |
| 2003/0163811 A1 | 8/2003 | Luehrs |
| 2003/0233471 A1 | 12/2003 | Mitchell et al. |
| 2004/0143667 A1 | 7/2004 | Jerome |
| 2004/0148399 A1 | 7/2004 | Fenizia et al. |
| 2004/0158823 A1 | 8/2004 | Saint-Hilaire et al. |
| 2004/0172376 A1 | 9/2004 | Kobori et al. |
| 2004/0220926 A1 | 11/2004 | Lamkin et al. |
| 2004/0221308 A1 * | 11/2004 | Cuttner et al. ................... 725/46 |
| 2004/0234234 A1 * | 11/2004 | Loytana ............... H04N 5/4401 386/262 |
| 2004/0243700 A1 | 12/2004 | Weast |
| 2005/0004985 A1 * | 1/2005 | Stochosky .......... H04L 12/1813 709/205 |
| 2005/0021470 A1 * | 1/2005 | Martin ............. G06F 17/30749 705/51 |
| 2005/0044197 A1 | 2/2005 | Lai |
| 2005/0058066 A1 | 3/2005 | Sung |
| 2005/0070255 A1 * | 3/2005 | Cass ....................... H04M 3/42 455/414.1 |
| 2005/0076357 A1 | 4/2005 | Fenne |
| 2005/0091268 A1 | 4/2005 | Meyer et al. |
| 2005/0125564 A1 | 6/2005 | Bushmitch et al. |
| 2005/0138137 A1 | 6/2005 | Encarnacion et al. |
| 2005/0138179 A1 | 6/2005 | Encarnacion et al. |
| 2005/0138192 A1 | 6/2005 | Encarnacion et al. |
| 2005/0138193 A1 | 6/2005 | Encarnacion et al. |
| 2005/0160458 A1 | 7/2005 | Baumgartner |
| 2005/0166231 A1 | 7/2005 | Terakado et al. |
| 2005/0188092 A1 | 8/2005 | Short et al. |
| 2005/0198493 A1 | 9/2005 | Bartas |
| 2005/0220139 A1 | 10/2005 | Aholainen |
| 2005/0254524 A1 | 11/2005 | An |
| 2005/0283800 A1 | 12/2005 | Ellis et al. |
| 2006/0123010 A1 * | 6/2006 | Landry et al. ................. 707/10 |
| 2006/0168225 A1 | 7/2006 | Gunning et al. |
| 2006/0184540 A1 * | 8/2006 | Kung et al. .................... 707/10 |
| 2006/0206582 A1 * | 9/2006 | Finn ....................... H04H 60/73 709/217 |
| 2007/0088832 A1 | 4/2007 | Tsang et al. |
| 2007/0107016 A1 * | 5/2007 | Angel et al. .................... 725/61 |
| 2007/0107021 A1 * | 5/2007 | Angel et al. .................... 725/86 |
| 2007/0156726 A1 | 7/2007 | Levy |
| 2007/0244924 A1 | 10/2007 | Sadovsky et al. |
| 2007/0260580 A1 * | 11/2007 | Omoigui ........... G06F 17/30528 |
| 2008/0077501 A1 | 3/2008 | Kamei et al. |
| 2008/0090513 A1 | 4/2008 | Collins et al. |
| 2008/0168523 A1 * | 7/2008 | Ansari et al. ................. 725/131 |
| 2008/0232371 A1 * | 9/2008 | Hildreth et al. .............. 370/392 |
| 2009/0276807 A1 * | 11/2009 | Robotham ..................... 725/40 |

FOREIGN PATENT DOCUMENTS

| | | |
|---|---|---|
| EP | 1213919 | 6/2002 |
| JP | 05-035569 | 2/1993 |
| JP | 8335191 | 12/1996 |
| JP | 2002163182 A | 6/2002 |
| JP | 2002517852 | 6/2002 |
| JP | 2002328905 A | 11/2002 |
| JP | 2003256260 | 9/2003 |
| RU | 2287229 | 11/2006 |
| SO | WO03103180 A1 | 12/2003 |
| TW | 468343 | 12/2001 |
| WO | WO03083721 | 10/2003 |
| WO | WO03098446 A1 | 11/2003 |
| WO | WO03098932 | 11/2003 |

OTHER PUBLICATIONS

Bell, et al., "A Call for the Home Media Network," Communications of the ACM, vol. 45, No. 7, Jul. 2002, pp. 71-75.

Translated Chinese Office Action mailed on Dec. 28, 2010 for Chinese Application No. 200680047188.9, a counterpart foreign application of U.S. Appl. No. 11/275,159, 13 pages.

"ConnectionManager:1 Service Template Version 1.01," Microsoft Corporation, Jun. 25, 2002, available at <<http://www.upnp.org/download/ConnectionManager%201.0.pdf>>, 25 pages.

"ContentDirectory:1 Service Template Version 1.01,"Microsoft Corporation, Jun. 25, 2002, available at <<http://www.upnp.org/download/ContentDirectory%201.0.prtad.pdf>>, 89 pages.

"DeviceSecurity:1 Service Template, for UPNP Device Architecture 1.0" retrieved from the internet at <<http://www.upnp.org/standardizeddcps/documents/DeviceSecurity_1.0cc_001.pdf>> on Nov. 17, 2003, pp. 1-66.

European Office Action mailed Apr. 29, 2011 for European Patent Application No. 09012872.9, a counterpart foreign application of U.S. Pat. No. 7,555,543, 6 pages.

"Fast User Switching," MSDN Library entry, Microsoft Corporation, accessed on Oct. 30, 2003, available at <<http://msdn.microsoft.com/library/default.asp?url=/library/en-us/directx9_c/directx/play/understand/voice/userswitching.asp>>, 1 page.

Fuchs, A. et al., "End to End Content Delivery using UPnP and WiFi Networking", Future Generation Software Architectures in the Automotive Domain—Draft Paper, Connected Services in Mobile Networks—San Diego, CA, USA, Jan. 10-12, 2004, pp. 1-11.

Gebhard et al., "Virtual Broadcast—A Novel Service Based on IP Multicast", retrieved on Jan. 18, 2006 at <<http://www.nt.e-technik.uni-dortmund.de/m_gh/folder/Virtual_Broadcast.pdf>>, 9 pages.

Kazai et al., "Using Metadata to Provide Scalable Broadcast and Internet Content and Services", retrieved on Jan. 18, 2006 at <<http://www.dcs.qmul.ac.uk/~mounia/CV/Papers/Wiamis2003.pdf>>, 7 pages.

Korean Office Action mailed Feb. 11, 2011 for Korean Patent Application No. 10-2005-7012336, a counterpart foreign application of U.S. Pat. No. 7,555,543, 4 pages.

"MediaRenderer:1 Device Template Version 1.01," Microsoft Corporation, Jun. 25, 2002, available at <<http://www.upnp.org/download/MediaRenderer%201.0.pdf>>, 11 pages.

(56) References Cited

OTHER PUBLICATIONS

"MediaServer:1 Device Template Version 1.01," Microsoft Corporation, Jun. 25, 2002, available at <<http://www.upnp.org/download/MediaServer%201.0.pdf>>, 12 pages.
O'Connor, et al., "Fischlar: An On-Line System for Indexing and Browsing Broadcast Television Content", retrieved on Jan. 18, 2006 at <<http://mti.xidian.edu.cn/multimedia/2002/supp/icassp2001/MAIN/papers/pap879.pdf>>, 4 pages.
"RomPager Product Family," available at <<http://www.allegrosoft.com/products.html>>, accessed on Nov. 8, 2005, 2 pages.
"SimpleWare Media Server," available at <<http://www.simpledevices.com/mediaserver.shtml>>, accessed on Nov. 8, 2005, 2 pages.
"SoftPedia, Nero MediaHome," available at <<http://www.softpedia.com/get/Internet/File-Sharing/Nero-MediaHome.shtml>>, accessed on Nov. 8, 2005, 3 pages.
"Statement in Accordance with the Notice from the European Patent Office Dated Oct. 1, 2007 Concering Business Methods", Official Journal of the European Patent Office, Nov. 1, 2007, pp. 592-593.
Steinfeld, "Devices that play together, work together," EDN, Sep. 13, 2001, pp. 65-70.
Steinfeld, "Knock! Knock! 'Who's There?': Using UPnP to Respond to Inquiries," Circuit Cellular Online, May 2001, pp. 1-5.
"The HAVi Specification. Version 1.1—Chapter 1: General", retrieved from the Internet on Jul. 31, 2008 <<http//www.havi.org/HAVI_1.1.pdf>>, XP007905335, May 15, 2001, pp. 1-7.
"The HAVi Specification. Version 1.1—Chapter 2: Overview", retrieved from the Internet on Jul. 31, 2008 <<http//www.havi.org/HAVI_1.1.pdf>>, XP007905336, May 15, 2001, pp. 8-24.
"The HAVi Specification. Version 1.1—Chapter 3: Software Elements Descriptions", retrieved from the Internet on Jul. 31, 2008 <<http//www.havi.org/HAVI_1.1.pdf>>, XP007905337, May 15, 2001, pp. 25-98.
"The HAVi Specification. Version 1.1—Chapter 5: Software Element APIs and Protocols", retrieved from the Internet on Jul. 31, 2008 <<http//www.havi.org/HAVI_1.1.pdf>>, XP007905339, May 15, 2001, pp. 108-295.
"The LocalService Account," MSDN Library entry , Microsoft Corporation, accessed on Oct. 30, 2003, available at <<http://msdn.microsoft.com/library/default.asp?url=/library/en-us/dllproc/base/localservice_account.asp>>, 2 pages.
"The LocalSystem Account," MSDN Library entry, Microsoft Corporation, accessed on Feb. 6, 2004, available at <<http://msdn.microsoft.com/library/default.asp?url=/library/en-us/ad/ad/the_localsystem_account.asp>>, 1 page.
Tokmakoff et al., "Home Media Server Content Management", retrieved on Jan. 17, 2006 at<<http://adsabs.harvard.edu/cgi-bin/nph>>, 2 pages.
"TwonkyMedia—Features," available at <<http://www.twonkyvision.de/UPnP/>>, accessed on Nov. 8, 2005, 2 pages.
"Understanding Universal Plug and Play," Jun. 2000, Microsoft Corporation, available at <<http://www.upnp.org/download/UPNP_UnderstandingUPNP.doc>>, 39 pages.
Universal plug and Play Device Architecture: Version 1.0, Microsoft Corporation, Jun. 8, 2000, available at <<http://www.upnp.org./download/UPnPDA10_20000613.htm>>, 52 pages.
UPnP AV Architecture:083, Microsoft Corporation, Jun. 12, 2002, available at <<http://www.upnp.org/download/UPnPAvArchitecture%200.83.prtad.pdf>>, 22 pages.
"UPnP Framework," MSDN Library introductory page, Microsoft Corporation, accessed on Oct. 19, 2003, available at [http://msdn.microsoft.com/library/default.asp?url=/library/en-us/wceupnps/html/_wcecomm_win32_UPnP_Framework.asp], 1 page.
European Office Action mailed Oct. 24, 2012 for European patent application No. 04757285.4, a counterpart foreign application of U.S. Pat. No. 7,555,543, 5 pages.
European Office Action mailed Jun. 25, 2012 for European patent application No. 04779160.3, a counterpart foreign application of U.S. Pat. No. 7,668,939, 6 pages.
European Search Report mailed Apr. 4, 2012 for European patent application No. 04779160.3, 4 pages.
Indian Office Action mailed Nov. 18, 2013 for Indian patent application No. 2749/DELNP/2005, a counterpart foreign application of U.S. Pat. No. 7,668,939, 1 page.
European Office Action mailed Jul. 28, 2015 for European Patent Application No. 09012872.9, a counterpart foreign application of U.S. Pat. No. 7,555,543, 6 pages.
European Office Action mailed Jul. 31, 2015 for European Patent Application No. 04757285.4, a counterpart foreign application of U.S. Pat. No. 7,555,543, 5 pages.

* cited by examiner

REGISTERING, TRANSFERRING, AND ACTING ON EVENT METADATA

CROSS REFERENCE TO RELATED APPLICATIONS

This patent application is a continuation application of, and claims priority to, co-pending, commonly-owned U.S. patent application Ser. No. 11/379,031, entitled "REGISTERING, TRANSFERRING, AND ACTING ON EVENT METADATA", and filed on Apr. 17, 2006, which application is incorporated herein in its entirety by reference.

BACKGROUND

Advances in media-related technologies have given users the opportunity to select from a great number of media items, such as songs, games, video programs, and so forth. However, improvements in these technologies have also introduced new challenges. A user may find it time-consuming and cumbersome to search through a large collection of media items to find one or more media items of interest. For instance, even if the user knows the identity of a desirable item, the user may have difficulty sifting through the large collection to find this item.

In other instances, the user may be consuming a broadcast of media items and encounter one or more items that interest the user. As appreciated by the present inventors, the user may wish to purchase the interesting media items or otherwise discover more about the interesting media items. However, conventional broadcast technology does not incorporate a mechanism that allows a user to interact with a source of broadcast content and therefore does not include provisions for allowing the user to purchase or otherwise discover more about the interesting media items. For instance, a conventional radio includes no mechanism that allows a user to purchase songs that are broadcast to the user via the radio.

There is therefore a need in the art for more effective strategies for accessing media items and other content.

SUMMARY

The following description sets forth a technique and associated mechanism for registering event metadata at a first site, transferring the event metadata to a second site using a portable module, and processing the event metadata at the second site. A user can register the event metadata in the course of consuming broadcast content. Namely, when the user encounters an interesting portion of the broadcast content, the user activates an input mechanism, resulting in the storage of event metadata associated with the interesting portion on the portable module. More generally, the event metadata can include one or more of the following data items: (a) preference data that reflects the user's interest in content; (b) intent data that reflects an action that the user wishes to take with respect to identified content; and (c) context data that reflects the circumstances surrounding the user's selection of content, and so on. The second site can upload the event metadata from the portable module and forward the event metadata to a remote service module. The remote service module can provide content that corresponds to the event metadata. Optionally, the remote service module can also provide recommended content that is selected based on the event metadata (but does not otherwise have a one-to-one correspondence to the event metadata). The portable module can comprise a portable media device, a personal digital assistant, a memory card, or other kind of portable device that includes memory for retaining event metadata.

The above technique confers a number of benefits. According to one exemplary benefit, the technique unobtrusively integrates an event registration mechanism "on top" of the user's consumption of broadcast content or other media consumption experience. This provision allows the user to easily register their preferences and other instructions while consuming broadcast content, that is, without performing the potentially burdensome task of manually sifting through a large collection of content items.

The subject matter set forth in this Summary section refers to exemplary manifestations of the invention, and hence does not limit the scope of the invention set forth in the Claims section.

Figure 1:
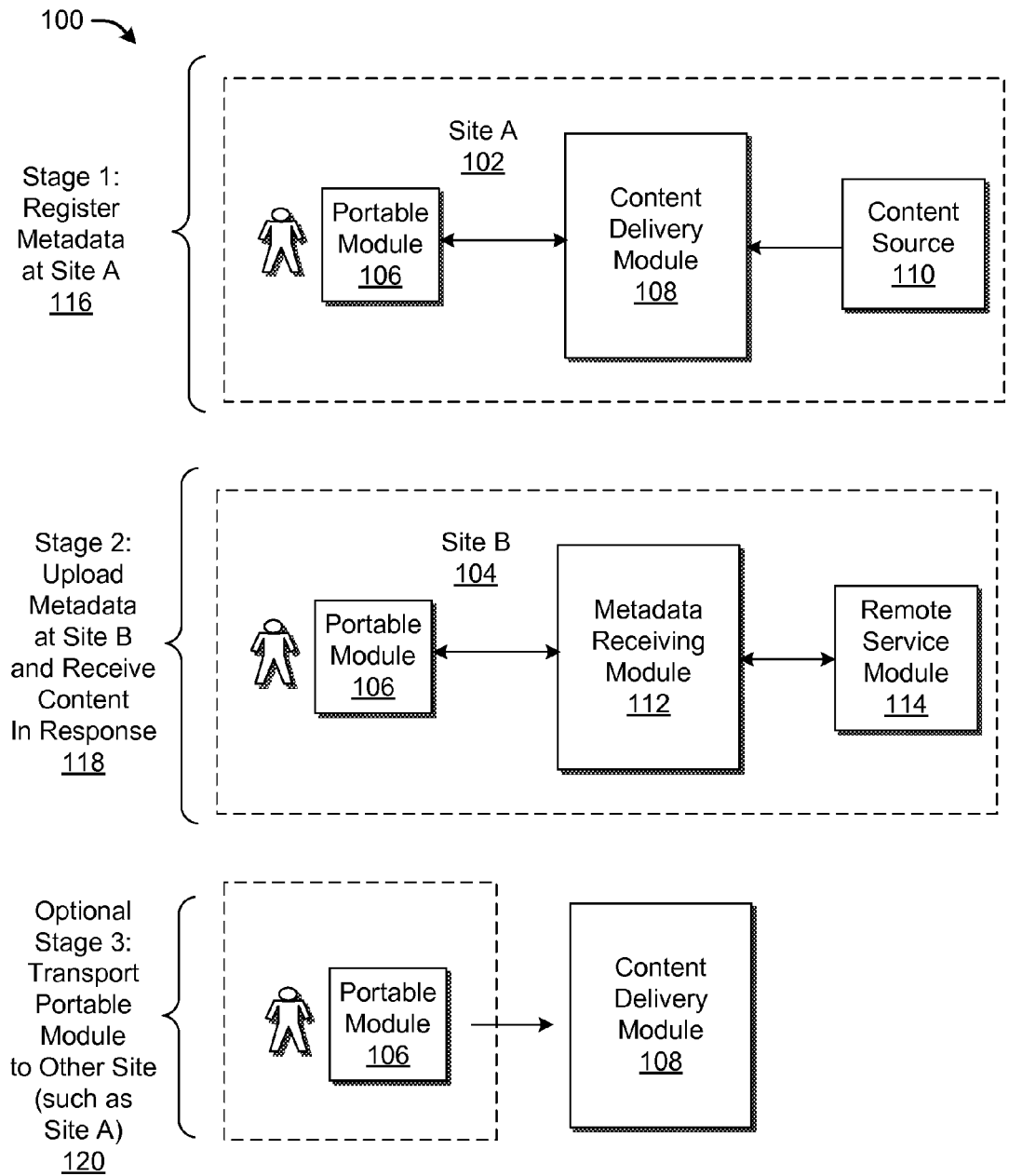
FIG. 1 shows an exemplary overview of a system for registering event metadata at a first site, storing the event metadata on a portable module, transferring the portable module to a second site, and uploading and acting on the event metadata at the second site.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth a technique and associated mechanism for registering user event metadata at a first site (site A), transferring the event metadata to a second site (site B), and then acting on the event metadata at site B. The event metadata can be registered by the user in the course of the user's consumption of a broadcast at site A, or in the course of some other activity of the user at site A.

The term "event metadata" has broad connotation. It refers to any data that is in any way associated with content. For instance, the event data can include one or more of the following data items: (a) preference data that reflects the user's interest in content (such as the user's indication that he or she is interested in a particular song that is being broadcast over a radio); (b) intent data that reflects an action that the user wishes to take with respect to identified content (such as the user's instruction to purchase the broadcast song); and (c) context data that reflects the circumstances surrounding the user's selection of content (such as information that reflects a location at which the user consumed the broadcast song, a device through which the user consumed the broadcast song, and so on). The event data can include yet other information associated with the content.

The term "content" refers to any target of the user's interest, including, but not limited to, media content that is broadcast to the user for the user's consumption at site A, including music information, static pictorial information, video information, game information, and so on. Content can also refer to physical objects or places that the user expresses an interest in (or is presumed to have expressed an interest in).

This disclosure includes the following sections. Section A sets forth an exemplary system for registering, transferring, and later acting on event metadata. Section B sets forth exemplary procedures that explain the operation of the system of Section A.

A. Exemplary System

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the term "logic," "module," or "functionality" represents program code (and/or declarative-type instructions) that performs specified tasks when executed on a processing device or devices (e.g., CPU or CPUs). The program code can be stored in one or more computer readable memory devices.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

A.1. Overview of the System (FIG. 1)

FIG. 1 shows an overview of a system 100 for registering, transferring, and processing event metadata. The system 100 encompasses at least two sites, site A 102 and site B 104. Broadly stated, site A 102 comprises a site at which the user registers event metadata, and site B 104 is a site at which the user later performs some processing on the event metadata.

The sites (102, 104) may refer to separate geographic locations and associated functionality provided at those separate locations. In an alternative implementation, site A 102 and site B 104 can refer to the same geographic location, and optionally, these sites can even rely on the same functionality or overlapping functionality. The system 100 also includes a portable module 106. The portable module 106 is used to transfer event metadata from site A 102 to site B 104.

The exemplary components shown in FIG. 1 will be discussed on a general level in further detail below. The next subsection discusses different applications of the system 100 shown in FIG. 1.

Starting with site A 102, this site includes any kind of equipment for delivering content to the user. This equipment is represented in FIG. 1 as a content delivery module 108 (referred to for brevity below as "delivery module" 108). In one implementation, the delivery module 108 can receive content from one or more content sources 110 and provide the content to the user. The delivery module 108 also provides an interface (not shown) that allows the portable module 106 to be communicatively coupled to delivery module 108.

In operation, the user consumes the content that is delivered by the delivery module 108. In a first scenario, when the user is interested in a particular part of the content being delivered by the delivery module 108, such as a particular song, the user can actuate an input mechanism (not shown) provided by the delivery module 108. In response to this actuation, the delivery module 108 provides preference data that identifies the part of the content that was being presented when the user activated the input mechanism. This data is referred to as "preference data" because it registers the user's interest in (or preference for) particular content. The delivery module 108 stores this preference data on the portable module 106.

In a second scenario, the delivery module 108 can also receive intent data from the user. The intent data reflects the user's instructions to perform some action on particular content. For example, in addition to registering a preference for a particular song that is being broadcast, the user can also register an instruction to later purchase the identified song, or perform some other action with respect to the identified song (such as add the song to a list of favorite songs maintained by the user, and so on.) In one case, the preference and intent data can comprise two distinct items of information input by the user. In another case, the intent data can also serve the role of preference data, because, in addition to setting forth instructions regarding particular content, the intent data also implicitly registers the user's interest in the particular content.

In a third scenario, the delivery module 108 can also receive context data associated with the user's selection of content. For example, the delivery module 108 can record salient information regarding the circumstances of the user's selection of a particular song, such as the location and/or time at which the user selected the song, the type of delivery module 108 through which the user received the song (e.g., a car radio, etc.), and so on. The location information can be gauged by various known technologies, such as vehicle-borne GPS technology.

In a variant of the third scenario, the delivery module 108 can receive context data without receiving preference data and/or intent data, and even without necessarily receiving broadcast content. One example of this scenario is set forth in the next subsection.

In general, all of the above-described data (preference data, intent data, and context data) comprises so-called event metadata. In the following discussion, the term event metadata will be used without always expressly identifying the components of this data (e.g., whether this data includes preference data, intent data, and/or context data); it is to be understood that the event metadata can include any combination of such enumerated data types, as well as other data types.

Site B 104 includes any kind of equipment for uploading the event metadata from the portable module 106 and performing some processing on the event metadata. FIG. 1 labels this equipment as metadata receiving module 112 (referred to for brevity below as "receiving module" 112). The receiving module 112 provides an interface (not shown) that allows the portable module 106 to be communicatively coupled to the receiving module 112. The receiving module 112 also can be communicatively coupled to a remote service module 114.

In operation, the receiving module 112 uploads the event metadata from the portable module 106 and performs processing on the event metadata. In one application, the processing can involve sending the event metadata to the remote service module 114. Upon receipt, the remote service module 114 can provide content to the user that is associated with the event metadata. In one implementation, the receiving module 112 can forward such content to the user for consumption by the user via the receiving module 112 at site B 104. In another implementation, the receiving module 112 can transfer the forwarded content to the portable module 106, where the content can later be consumed by the user at another site, such as at the delivery module 108 of site A.

To summarize, the operations performed by the system 100 can be regarded as a three stage process. In a stage 1 (116), the user couples the portable module 106 to delivery module 108 of site A 102. The delivery module 108 delivers content to the user (or otherwise exposes the user to content) and also registers event metadata that reflects the user's presumed interest in portions of the delivered content. The delivery module 108 stores the event metadata on the portable module 106. In a stage 2 (118), the user transports the portable module 106 to the receiving module 112 of site B 104. The delivery module 108 uploads the event metadata and performs some processing on the event metadata, which may involve transferring content associated with the event metadata back to the portable module 106. In an optional stage 3 (120), the user can transport the portable module 106 to any site at which the transferred content can be consumed, such as site A 102.

In an alternative implementation, the system 100 does not require the physical transport of the portable module 106 from site A 102 to site B 104. Rather, the delivery module 108 can record the event metadata on the portable module 106 at site A 102 and thereafter electronically transfer the event metadata to the receiving module 112 at site B 104. Such transfer can be performed using any kind of physical conduit of information (such as one or more hardwired network links and/or one or more wireless network links), governed by any protocol or combination of protocols, such as, but not limited to, Media Transfer Protocol (MTP) over TCP/IP. Thus, in this implementation, the potable module 106 can optionally be implemented as a storage module which remains fixed within the delivery module 108. For example, the portable module 106 can comprise a hard disk or like storage device which is physically incorporated into a vehicle-borne delivery module 108.

A.2. Exemplary Applications of the System

Figure 2:
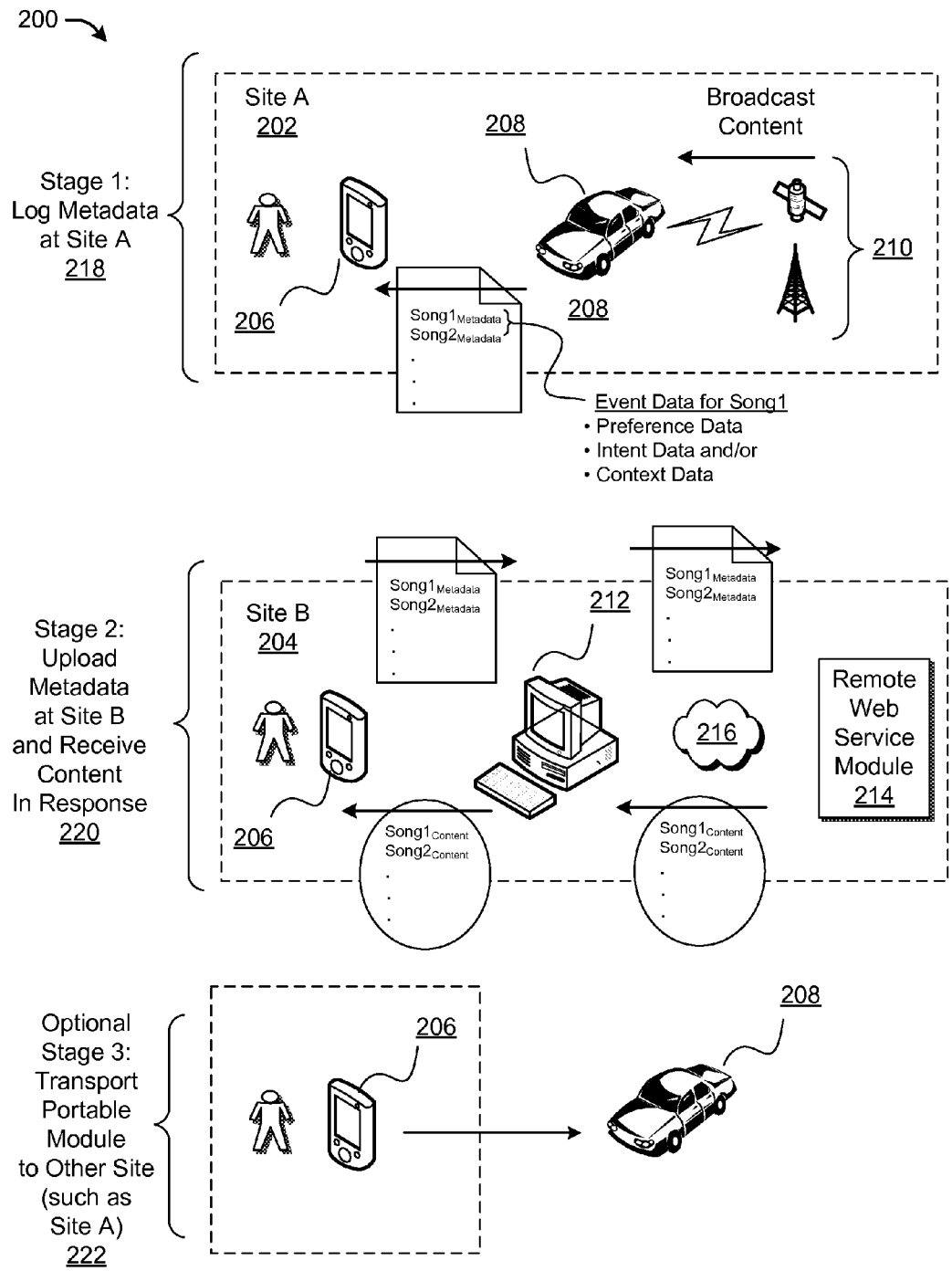
FIG. 2 shows an exemplary specific implementation of the system of FIG. 1.

FIG. 2 shows a system 200 that represents one application of the system 100 of FIG. 1. The system 200 includes counterpart components to those shown in FIG. 1, including a site A 202, a site B 204, and a portable module 206 for transferring event metadata from site A 202 to site B 204.

In system 200, site A 202 pertains to a mobile environment in which the user consumes broadcast content through broadcast equipment in a vehicle, such as an automobile. In this environment, the site A 202 includes a delivery module 208 within the vehicle. For instance, the delivery module 208 can comprise a radio that is accessible via the dash console of the vehicle. The radio delivery module 208 includes a wireless interface for receiving broadcast content (such as broadcast music and other programs) from a broadcast source 210. The broadcast source 210 can comprise any kind of broadcast provider, such as provider that uses a terrestrial antenna system, a provider that uses a satellite delivery system, and so forth.

The delivery module 208 also includes an interface (not shown) for receiving the portable module 206. In one implementation, the portable module can comprise a portable media player, a personal digital assistant, a memory card, or any other kind of transportable device that includes memory for retaining event metadata. The delivery module can couple to the portable module 208 in a variety of ways. For example, the delivery module 208 can include a slot or other physical interface which can receive the portable module 206. Or the delivery module 208 can couple to the portable module 206 via a communication line. Once physically coupled together, the portable module 206 and the delivery module 208 can exchange data. Any kind of mechanism can be used to perform this transfer, such as, but not limited to, a universal serial bus (USB) mechanism. The exchange of data can be governed by any protocol, such as, but not limited to, the Media Transfer Protocol (MTP).

In operation, the user can use the delivery module 208 in the vehicle to listen to broadcast content in a conventional manner, that is, by tuning the delivery module 208 to one or more radio stations to listen to music while driving. When the user hears content (such a song) that interests him or her, the user can activate an input mechanism (not shown) provided by the delivery module 208. For instance, the input mechanism can comprise a button that is readily accessible by the user while driving the vehicle, such as a button located on the steering wheel of the vehicle. In response to this actuation, the delivery module 208 can access event metadata associated with the content (e.g., the song) that happens to be playing at the time that the user activates the input mechanism. The metadata can identify the name of the song, the track of the song on an album in which the song appears, the artist(s) of the song, one or more codes associated with the song, and any other descriptive information associated with the song. This type of event metadata constitutes the above-mentioned preference data because it identifies the content that is preferred by the user.

In addition, or alternatively, the event metadata can include intent data and/or context data. Intent data can include supplemental data that reflects some action that the user wishes to perform on the identified content, such as an instruction to purchase the content, archive the content, add the content to a favorite list, transfer the content to a friend, and so forth. Context data can comprise any data which reflects the circumstances in which the user selected the content, such as the location and/or time at which the user selected the content, the mechanism through which the user received the selected content (e.g., a car radio, etc.), and so forth.

Event metadata can be provided in different ways. As to preference data, in one case, the content source 210 can embed descriptive metadata along with the media content that is transmitted to the delivery module 208. The delivery module 208 can be configured to extract the descriptive metadata from the transmitted media content. In another case, the delivery module 208 can send the media content in a first channel and the descriptive metadata in a second, separate, channel. Intent data and context data can be received by various means, such by one or more user interface mechanisms that can be manipulated by the user (e.g., comprising, but not limited to, buttons, touch sensitive panels, voice recognition mechanisms, etc.). Intent data and context data can also be received through various automatic data-providing mechanisms, such as position determination mechanisms (e.g., GPS technology), time-keeping mechanisms, and so forth. In any event, the delivery module 208 can store all such collected event metadata in the memory of the portable module 206.

At site B 204, a receiving module 212 can be provided which comprises a personal computer, game console, set-top box or any other kind of data processing device. As described with reference to FIG. 1, the receiving module 212 can include an interface (not shown) that allows the portable module 206 to be communicatively coupled to the receiving module 212. In one case, the portable module 206 can be connected to the receiving module 212 by a communication line, such as a wire or cable. In another case, the portable module 204 can be connected to the receiving module 212 through a docking receptacle or cradle (not shown) incorporated into the receiving module 212. Still other interconnection implementations are possible. Through this communication channel, the receiving module 212 can upload the event metadata stored on the portable module 206 into a memory (not shown) of the receiving module 212. Also, this communication channel can be used to forward data (such as content) from the receiving module 212 to the portable module 206. Any kind of mechanism can be used to exchange data between the portable module 206 and the receiving module 212, such as a USB mechanism.

In an alternative implementation, as described above, the portable module 206 can remain coupled to the delivery module 208. At time of transfer, the delivery module 208 can transfer the event metadata to the receiving module 212 via any combination of hardwired and/or wireless links, governed by any combination of protocols.

Once the receiving module 212 receives the event metadata, it can perform various processing on the event metadata, where the nature of such processing depends on the application. In one application, this processing can involve displaying the event metadata for inspection by the user, and/or transferring the event metadata to a remote service module 214. The remote service module 214 can comprise a web site that includes one or more server computers, storage, and/or other processing equipment. In this scenario, the remote service module 214 can interact with the receiving module 212 through a wide area network 216, such as the Internet. Alternatively, or in addition, the network 216 can comprise an intranet, an Ethernet network, a point-to-point coupling mechanism, and so on, or some combination thereof.

The remote service module 214 can use the event metadata as a lookup key to retrieve the actual content associated with the event metadata. The remote service module 214 can then forward the actual content back to the receiving module 212. For instance, in one case, the event metadata identifies one or more songs, e.g., by providing the titles of the songs, codes assigned to the songs, and so forth. The remote service module 214 can use this event metadata as a lookup key to retrieve the digital data corresponding to the song content, and can then forward the song content to the portable module 206. This operation can be performed by accessing a lookup table which maps the metadata identified in the event metadata to the actual song content. In an alternative implementation, the remote service module 214 need not immediately transfer the actual song content to the receiving module 212. Instead, the remote service module 214 can change the status the identified songs to indicate that the receiving module 212 or other entity is authorized to download these songs. The receiving module 212 or other entity can then later download the song content.

In one case, the processing which is performed on the event metadata is governed by intent data which may form part of the event metadata. For example, in one instance, the intent data may indicate that the identified songs are to be purchased, whereupon the remote service module 214 carries out the purchase and delivery of the songs.

In the above example, the remote service module 214 provides content that has a one-to-one relationship with the event metadata. In other words, if the user indicates that she is interested in song X while listening to the radio in the vehicle, then the delivery module 208 stores metadata associated with song X on the portable module 206. The receiving module 212 later uses the metadata for song X to retrieve the content of song X from the remote service module 214 (or to perform some other action on song X). Additionally, or alternatively, the remote service module 214 can use the event metadata to send recommended content to the user or to perform some other action with respect to the recommended content. For instance, assume that the event metadata again identifies song X. In addition to providing the content of song X, the remote service module 214 can also provide the content for songs Y and Z. For example, the remote service module 214 may determine that songs Y and Z are related to song X (e.g., because these songs all share one or more characteristics in common). This recommendation function can also be used for cross-selling, up-selling, and so forth. In another case, the remote service module 214 does not actually forward the content corresponding to recommended songs, but merely sends a message to the user that invites the user to purchase the recommended songs.

The content sent to the receiving module 212 from the remote service module 214 can be forwarded to the user in any form. In one case, the user can consume (e.g., play) the forwarded content using the receiving module 212 itself. In another case, the receiving module 212 can transfer the content to another device. For instance, the receiving module 212 can transfer the downloaded content to the portable module 206. The user can then transport the portable module 206 back to the vehicle and couple it once again to the delivery module 208. The delivery module 208 can play the song content stored on the portable module 206 while the user drives the vehicle. Thus, in this case, the portable module 208 and delivery module 208 have a dual purpose: the first purpose is to record event metadata as the user consumes broadcast content provided by the content source 210; the second purpose is to play back the content that has been received from the remote service module 214 in response to previously uploaded event metadata.

To summarize, in a first stage (218), the user uses the portable module 206 and delivery module 208 to receive event metadata at site A 202. In a second stage (220), the user uploads the event metadata at site B 204 to the receiving module 212 and receives content corresponding to the uploaded event metadata from the remote service module 214. In a third stage (222), the user optionally transports the received content back to site A via the portable module 206 and plays the content using the delivery module 208.

The scenario shown in FIG. 2 is merely one of many scenarios that can utilize the general principles set forth in FIG. 1. The following discussion sets forth additional exemplary applications of the system 100 shown in FIG. 1.

In another application, site A 102 can comprise any location at which the user consumes video programs. For example, the delivery module 108 can comprise a television or other video output device that allows the user to watch television, movies, and so forth. A remote control device (not shown) can be used to interact with the video output device. The remote control device can include one or more buttons that allow the user to register interest in the video content that is being provided. In the manner described with respect to FIG. 1, the delivery module 108 can correlate the user's actuation of the input mechanism with metadata that describes the content that happens to be playing when the user actuates the input mechanism. The delivery module 108 can store this event metadata on a portable module 106 (such as a memory card). The user can then carry the portable module 106 to the receiving module 112 (such as a personal computer or other processing device) at site B 104, whereupon some prescribed processing is performed based on the event metadata.

Consider, for example, the case in which the user is watching a commercial for a product that is being offered for sale. The user can activate the input mechanism during the commercial, producing event metadata that is stored on the portable module 106. The event metadata identifies the product, e.g., by including a code associated with the product, or by including data that identifies the commercial that features the product, and so on. The portable module 106 can then be transferred to the user's personal computer (which acts as the receiving module 112), whereupon the personal computer can upload the event metadata from the portable module 106. The personal computer can then interact with a remote merchandising service (which acts as the remote service module 114) to consummate a transaction based on the event metadata. For instance, the merchandising service can allow the user to purchase or otherwise acquire the product identified by the event metadata.

Note that, in the above example, the delivery module 108 can be conceptualized as the television in conjunction with the remote control device (not shown). In this case, the device which actually registers the event metadata (i.e., the remote control device) is not physically coupled to the device that delivers the televised content (i.e., the television).

In another application, site A 102 can comprise any environment in which a user can physically move about, such as a store, a tourist site (such as a historic site), a zoo, a museum, and so on. In this scenario, site A 102 can include a mechanism that tracks the location of the user throughout the site, such as by using GPS technology, local transponder technology, etc. In addition, site A 102 can provide a portable (e.g., hand-held) delivery module 108 to each user who visits the site. The delivery module 108 can have an input mechanism that allows the user to register his or her interest in various items that he or she encounters while walking throughout the site. The delivery module 108 is configured to correlate the user's actuation of the input mechanism with event metadata; namely, the event metadata is associated with items physically nearby the user when he or she activates the input mechanism. Such a correlation can be performed based on the position of the user as determined by the tracking mechanism, and predetermined knowledge of where different items are located within the site. The thus-produced event metadata can be transferred to a portable module 106 (such as a memory card) and later used to access further information associated with the items that the user has expressed an on-site interest in.

Consider, for example, the application of this functionality to a historic battleground site or a museum. The user can activate a "tell me more" button each time the user comes across a site that interests him or her while walking throughout the site. When the user later returns to a receiving module 112 (which can be provided at a central tourist center or may comprise a personal computer located in the user's own home), the user can upload the event metadata to a remote service module 114 associated with the site, and, in return, receive literature and other information that further explains to the parts of the site that the user expressed an on-site interest in.

In another variant of the above-described example, GPS technology or other location determination technology can interface with a delivery module 108 located in the user's vehicle. The location determination technology can be used to determine patterns in the user's travel. This type of contextual event metadata can be registered on the portable module 106, and later, at the receiving module 112, correlated with commercial establishments that the user passes on a frequent basis, such as restaurants, stores, etc. This correlation can be performed by accessing a database that identifies the locations of commercial establishments, and then culling out a subset of these establishments which are located in proximity to the user's typical route. The receiving module 112, in possible conjunction with the remote service module 114, can then be used to deliver advertising material to the user which is associated with the identified commercial establishments. The advertising materials can include literature, coupons, and so forth. These materials may induce the user to patronize the identified establishments.

Note that, in the above example, the "content" that accompanies the registration of context data is actually associated with the physical environment through which the user passes, rather than broadcast media content (as in the example of FIG. 2). Further, in this example, the delivery module 108 does not actually deliver content, but rather serves the sole purpose of registering event metadata on the portable module 106.

In another application, the system 100 can register event metadata in an automatic fashion, that is, without necessarily receiving input selections from the user. For instance, the user can pre-register user profile criteria which define the type of content that the user prefers to consume. For example, the user can indicate that she likes music by a particular artist. In this scenario, the delivery module 108 can be configured to investigate the songs that are being broadcast over one or more channels to detect the transmission of songs that feature the desired artist. This detection operation can be performed in various ways, such as by comparing the user profile criteria with attribute data that may accompany the broadcast songs. When the delivery module 108 detects the occurrence of such songs, it can record associated event metadata on the portable module 106. Event metadata that is recorded in an automatic fashion can be associated with attribute data that identifies the fact that it has been automatically recorded (as opposed to manually recorded in response to the user's manual actuation); this attribute data can be later displayed to the user (e.g., at the receiving module 112) to help the user determine the context in which the event metadata was recorded.

In a variation of the above-described automatic registration of event data, the delivery module 108 can automatically infer the preferences of the user based on trends exhibited by the user's prior selection of songs.

In another variation of the above-described automatic registration of event data, the delivery module 108 can automatically record event metadata based on other considerations, such as commercial considerations (e.g., market-based considerations). For example, an advertiser can pay a fee to ensure that event metadata associated with advertising content is stored on the portable module 106.

Still other automated metadata recordation scenarios are possible.

In another application, a single delivery module 108 can record event metadata associated with plural users. For example, in the vehicle-borne scenario, plural individuals in a car can be simultaneously consuming different broadcast content. That is, for example, the driver can be listening to first content being broadcast over a first station, while a passenger can be listening (via headphones) to second content being broadcast over a second station. In the manner described above, the delivery module 108 can receive event metadata that reflects the preferences of both of these users. To implement this feature, each entry in the collection of event metadata can include user data which identifies the user to which the entry pertains, or the portable module 106 can include separate files for storing event metadata associated with different users, and so on. The delivery module 108 can determine the user-based affiliation of event metadata in different ways, such as by allowing each user to operate a different input mechanism, where event metadata registered though the different input mechanisms is associated with different respective users.

Still further applications are possible.

A.3. Delivery Module

Figure 3:
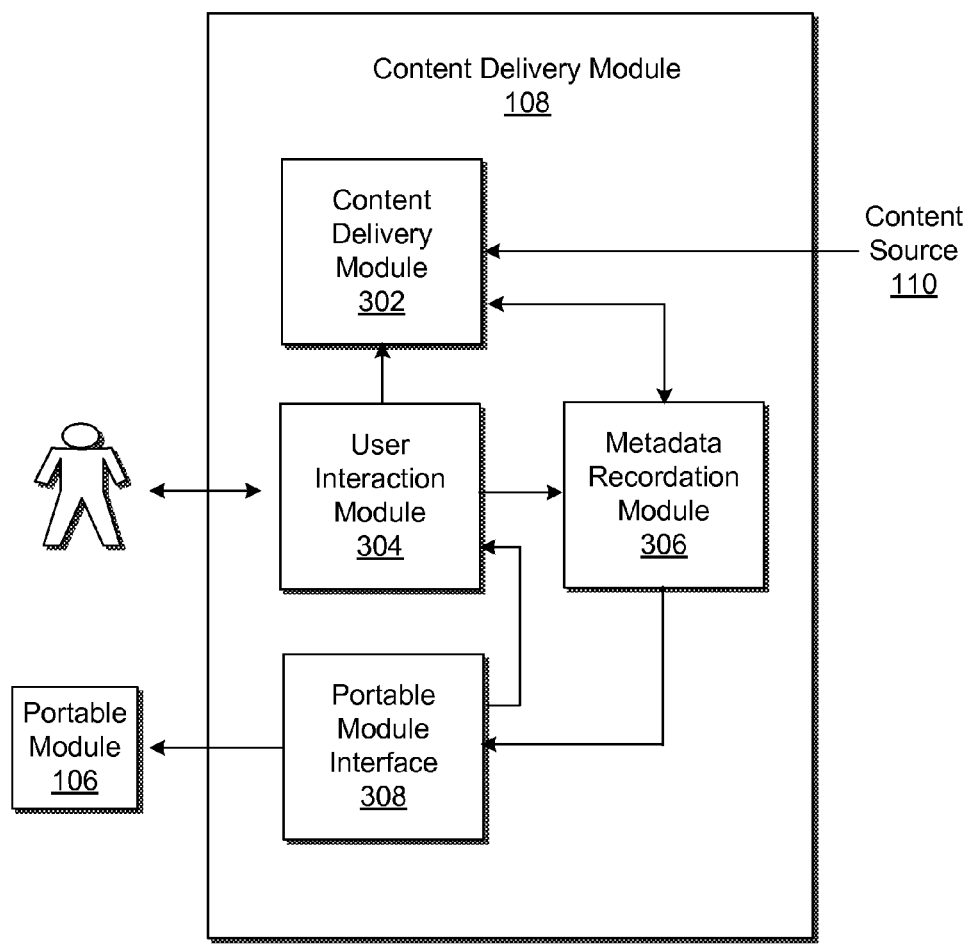
FIG. 3 shows exemplary additional details regarding a delivery module that is used by the first site in the system of FIG. 1.

FIG. 3 shows additional details regarding site A's delivery module 108 according to one exemplary implementation. The delivery module 108 includes a content delivery module 302 for receiving broadcast content (or other kinds of content, such as unicast on-demand content, etc.). For instance, in the case in which site A 102 is a vehicle, the content delivery module 302 can comprise a radio that is incorporated into or otherwise attached to the dash of the vehicle's operating panel. The content delivery module 302 delivers media content to the user in a conventional fashion, e.g., in response to the user tuning to a particular radio station.

Figure 4:
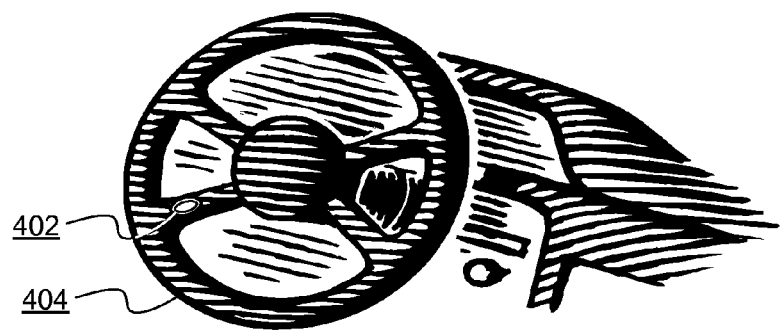
FIG. 4 shows an exemplary integration of the delivery module of FIG. 3 into a vehicle media system.

The delivery module 108 also includes a user interaction module 304. The user interaction module 304 includes an input mechanism (not shown) that allows the user to register his or her interest in a particular portion of the content that is delivered by the content delivery module 302. In the vehicle scenario shown in FIG. 2, for instance, the user interaction module 304 can include a button 402 (shown in FIG. 4) that is located on a steering wheel 404 or at another convenient location within the vehicle. Or the button 402 can be located on the portable module 106 itself (not shown in FIG. 4). The user can activate this button 402 when the user hears interesting content. In a television-viewing scenario, the user interaction module 304 can include a button (not shown) that is located on a remote control device. The button allows the user to register interest in a particular part of a video program being played on the user's television set. In any scenario, instead of a physical button, the user interaction module 304 can incorporate a voice recognition mechanism for registering the user's interest in content. For example, in the vehicle scenario, the user can speak the words, "I like it!" or "Record!" to prompt the delivery module 108 to record event metadata.

The above actuation mechanisms generally indicate the user's preference for a particular piece of content. In other cases, the user interaction module 304 can include a first selection mechanism for registering the user's general interest in a particular piece of content and a second selection mechanism for registering the user's instructions as to what action should be performed on the content. In still other cases, the user interaction module 304 can include plural action buttons (or the like) which allow the user to register different respective actions on the content (such as "Purchase It," "Send it to a Friend," "Add it to My Favorite List," etc.); in this case, the user interface module 304 can dispense with a separate preference-indicating mechanism, as the user's actuation of an action button implicitly suggests that the user is interested in a particular piece of content. Other input mechanism permutations are possible.

The delivery module 108 can also include a metadata recordation module 306. The metadata recordation module 306 identifies metadata for recordation in response to the actuation of the input mechanism provided by the user interaction module 304. In one case, the metadata recordation module 306 can perform this task by stripping descriptive metadata from broadcast media content when the user actuates the input mechanism. For example, the content source 110 can combine descriptive metadata with media content that it sends to the delivery module 108, such as by including descriptive metadata in the headers of packets containing media payloads, or by multiplexing metadata packets with media packets. In these cases, the metadata recordation module 306 picks out the descriptive metadata within a stream of media content. In another implementation, the content source 110 can dedicate entirely separate channels for delivering descriptive metadata and media content, respectively. In this case, the metadata recordation module 306 listens to both channels simultaneously and extracts the descriptive metadata from the metadata channel when the user actuates the input mechanism. In another scenario, the metadata recordation module 306 can infer the descriptive metadata based on the content being delivered, such as by automatically extracting keywords from a song, by extracting a digital signature based on a portion of the song, and so forth. In still another scenario, the content source 110 sends descriptive metadata on an on-demand basis, e.g., in response to the delivery module 108's request for such data corresponding to a particular piece of broadcast content.

The above-described data collected by the metadata recordation module 306 pertains to preference data. This preference data serves primarily to identify the content that the user is interested in. The metadata recordation module 306, in conjunction with the user interaction module 304, can also record intent data. The metadata recordation module 306, in conjunction with various other data-providing mechanisms (not shown), such as GPS technology, a time-keeping mechanism, and so forth, can also record contextual data.

Finally, the delivery module 108 includes a portable module interface 308. The purpose of the portable module interface 308 is to exchange data with the portable module 106. In one case, the portable module interface 308 can comprise a socket, cradle, or other docking arrangement that can physically receive the portable module 106. In another case, the portable module interface 308 can communicate with the portable module 106 via a communication line or wireless channel. The portable module interface 308 can use any protocol to exchange information with the portable module 106, such as the Media Transfer Protocol (MTP). In another implementation, the portable module 106 can be incorporated into the delivery module 108, and thereby can be relatively fixed with respect to the delivery module 108.

In one scenario, the portable module interface 308 is used to store event metadata received from the metadata recordation module 306 into a memory of the portable module 106. In another scenario, the portable module interface 308 is used to upload content from the memory of the portable module 106. For instance, this content may represent songs that the user has downloaded into the portable module 106 via the receiving module 112 (as will be described below in greater detail).

The delivery module 108 can include many other functions and modules; to facilitate explanation, FIG. 3 focuses on the modules described above which serve a role in the exchange of event metadata and content.

A.4. Portable Module

Figure 5:
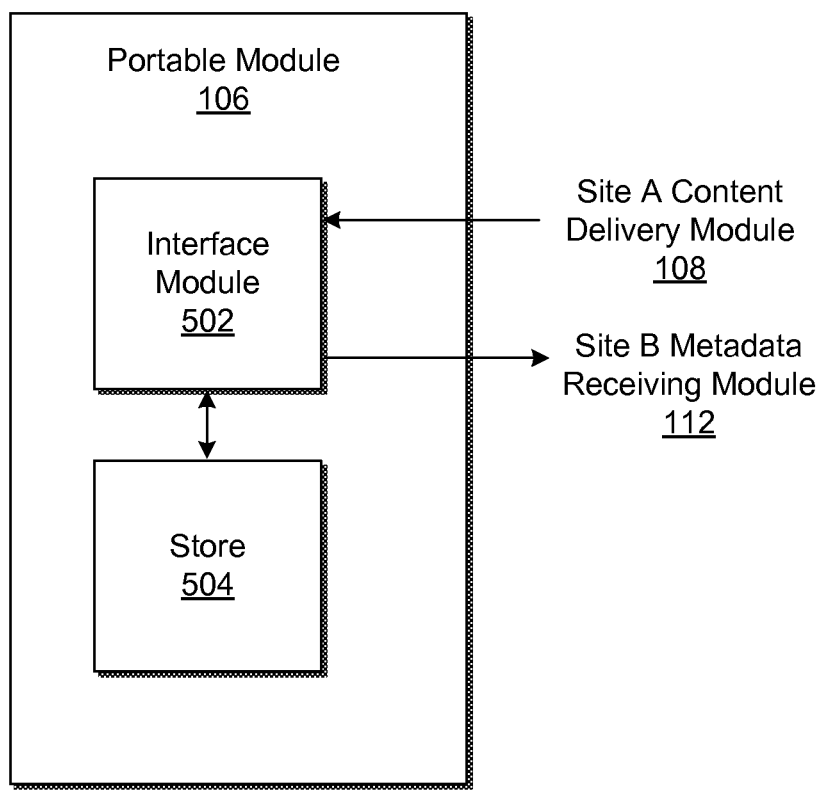
FIG. 5 shows exemplary additional details regarding the portable module that is used in the system of FIG. 1.

FIG. 5 shows further details of the portable module 106. As stated above, the portable module 106 can comprise any kind of transportable device that includes a memory for storing event metadata and, optionally, content. More specifically, the portable module 106 can include an interface module 502 for exchanging data with the delivery module 108 when coupled to the delivery module 108, and for exchanging data with the receiving module 112 when coupled to the receiving module 112. In one case, the interface module 502 can include two different mechanisms for interacting with the delivery module 108 and the receiving module 112, respectively. In another case, the interface module 502 can includes the same mechanism for interacting with the delivery module 108 and the receiving module 112. The interface module 502 can include any kind of physical connectivity mechanism for coupling to the delivery module 108 and the receiving module 112, such one or more input sockets or plugs for receiving a communication line, any structure for physically docking the portable module 106 into a receiving cradle, wireless communication mechanisms, and so forth.

The portable module 106 also includes a store 504. The purpose of the store 504 is to store event metadata received from the delivery module 108 and to optionally receive content received from the receiving module 112. The store 504 can be implemented by any kind of mechanism for retaining information; in one case, for instance, the store 504 comprises static solid-state memory.

It will be appreciated that the portable module 106 can include many other functions and modules; to facilitate explanation, FIG. 5 focuses on the modules described above which serve a role in the exchange of event metadata and content.

A.5. Receiving Module

Figure 6:
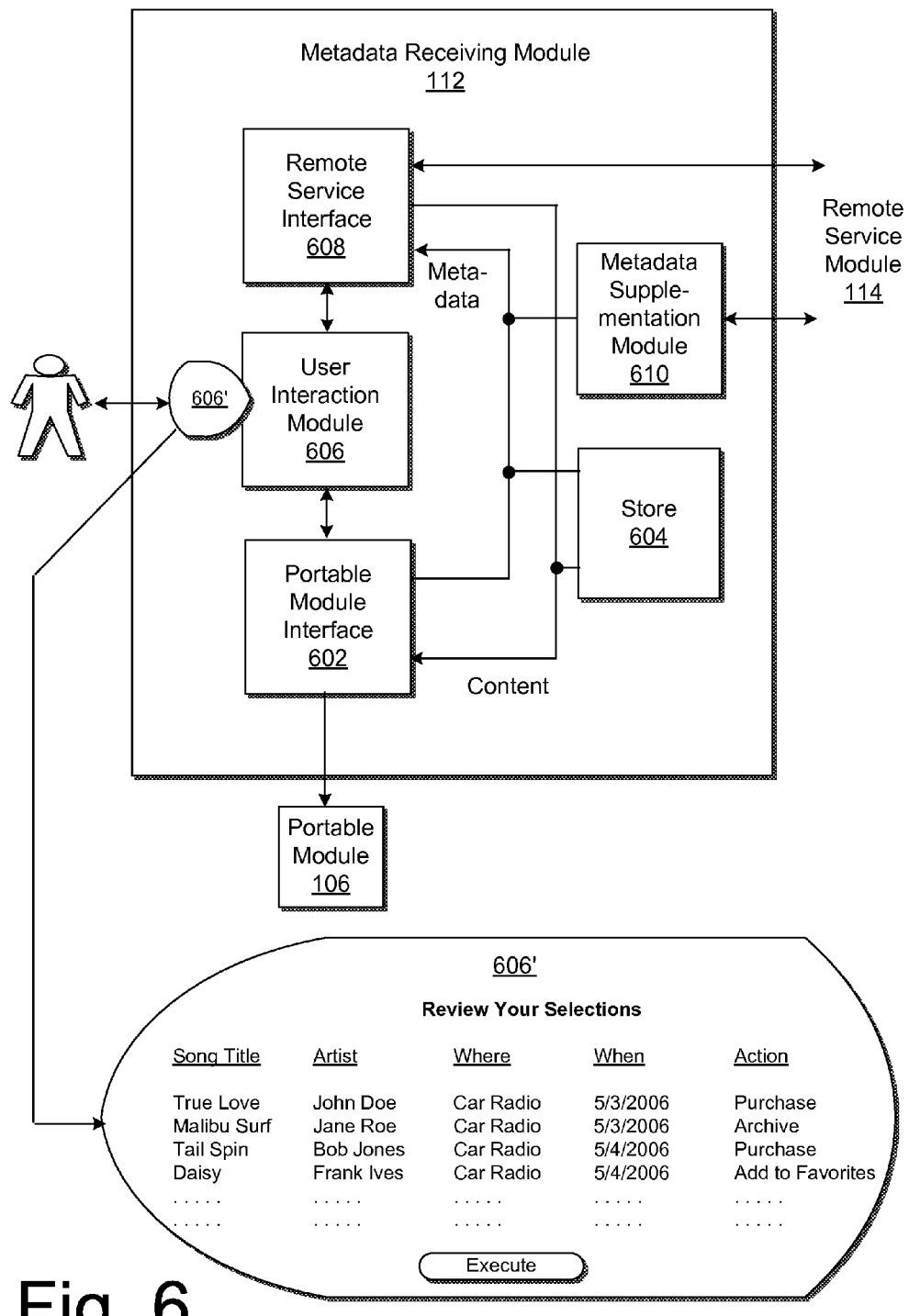
FIG. 6 shows exemplary additional details regarding a receiving module that is used by the second site in the system of FIG. 1.

FIG. 6 shows further details regarding the receiving module 112 provided at site B 104. The receiving module 112 includes a portable module interface 602 for receiving the portable module 106. The portable module interface 602 is used to upload event metadata from the portable module 106 and to download content to the portable module 106. The portable module interface 602 can be implemented in the same manner described above, e.g., using a variety of physical coupling mechanisms, a variety of protocols, and so on. In one case, for instance, the portable module interface 602 can comprise a USB coupling mechanism for exchanging information with the portable module 106 via a communication line. In other cases, the portable module interface 602 can incorporate a docking mechanism for physically receiving the portable module 106. In still another case, the portable module interface 602 can electronically receive event metadata from the portable module 106 (e.g., via one or more network links) while the portable module 106 is coupled to the delivery module 108.

The receiving module 112 can also include a store 604 for retaining event metadata, content, and other data in course of performing its functions.

The receiving module 112 can also include a user interaction module 606 which allows the user to interact with the receiving module 112. For instance, various functions performed by the receiving module 112 can be controlled by input received by the user. For instance, the user can instruct the receiving module 112 through suitable interface mechanisms to upload event metadata from the portable module 106, to download content to the portable module 106, and so forth. In one implementation, the user interaction module 606 can include a user interface component 606', a voice recognition component (not shown), and/or any other kind of interaction mechanism.

In one case, the user interaction module 606 can be used to display the event metadata upon uploading this data from the portable module 106. The bottom portion of FIG. 6 illustrates one such exemplary kind of presentation that the user interaction module 606 can use to display the event metadata. As shown there, the presentation can identify songs that have been registered at the first site 102. The presentation can also show contextual data associated with the registration ("where" or "how" the songs were registered, "when" the songs were registered, whether the songs were registered in response to manual actuation of an input mechanism or in response to automatic selection, and so on). The presentation can also show intent data associated with the registration ("what" actions the user originally intended to perform with respect to the identified content, and so on). The user can use this presentation to initiate various actions pertaining to the event metadata.

The receiving module 112 can include a remote service interface module 608. As the name suggestion, the purpose of this module 112 is to interact with a remote service module 114, such as by providing event metadata to the remote service module 114 and by receiving content and other data from the remote service module 114 in response thereto. In the case where the remote service module 114 comprises a web-accessible service, the remote service interface module 608 can comprise a high-speed broadband coupling mechanism, a dial-up type coupling mechanism, a DSL type coupling mechanism, and so on. The exchange of data with the remote service module 114 can be performed via any kind of digital network, such as a wide area network (e.g., the Internet).

However, use of the event metadata to retrieve associated content is only one possible use of this data. In another scenario, the receiving module 112 can archive the event metadata to derive a profile of the user's preferences. In another case, the receiving module 112 can use the event metadata to organize content or other resources maintained by the receiving module 112 or some other entity. For example, the receiving module 112 can use the event metadata as a guide to organize songs archived by the receiving module, such as by moving songs identified by the event metadata to a favorite folder (for easy access by the user).

Finally, the receiving module 112 can include a metadata supplementation module 610. The purpose of this module 610 is to supplement the event metadata extracted from the portable module 106 by the portable module interface 602. Namely, the delivery module 108 may not have had access to all of the event metadata needed to fully identify a piece of content. In this case, the metadata supplementation module 610 at the receiving module 112 can supply the missing event metadata. The metadata supplementation module 610 can perform this role in different ways. In one case, the metadata supplementation module 610 can contact a remote online service. The remote online service can use the incomplete event metadata that is supplied to it as a lookup key to determine the missing event metadata. The remote online service can then supply the missing event metadata to the receiving module 112.

It will be appreciated that the receiving module 112 can include many other functions and modules; to facilitate explanation, FIG. 6 focuses on the modules described above which serve a role in the exchange of event metadata and content.

A.6. Remote Service Module

Figure 7:
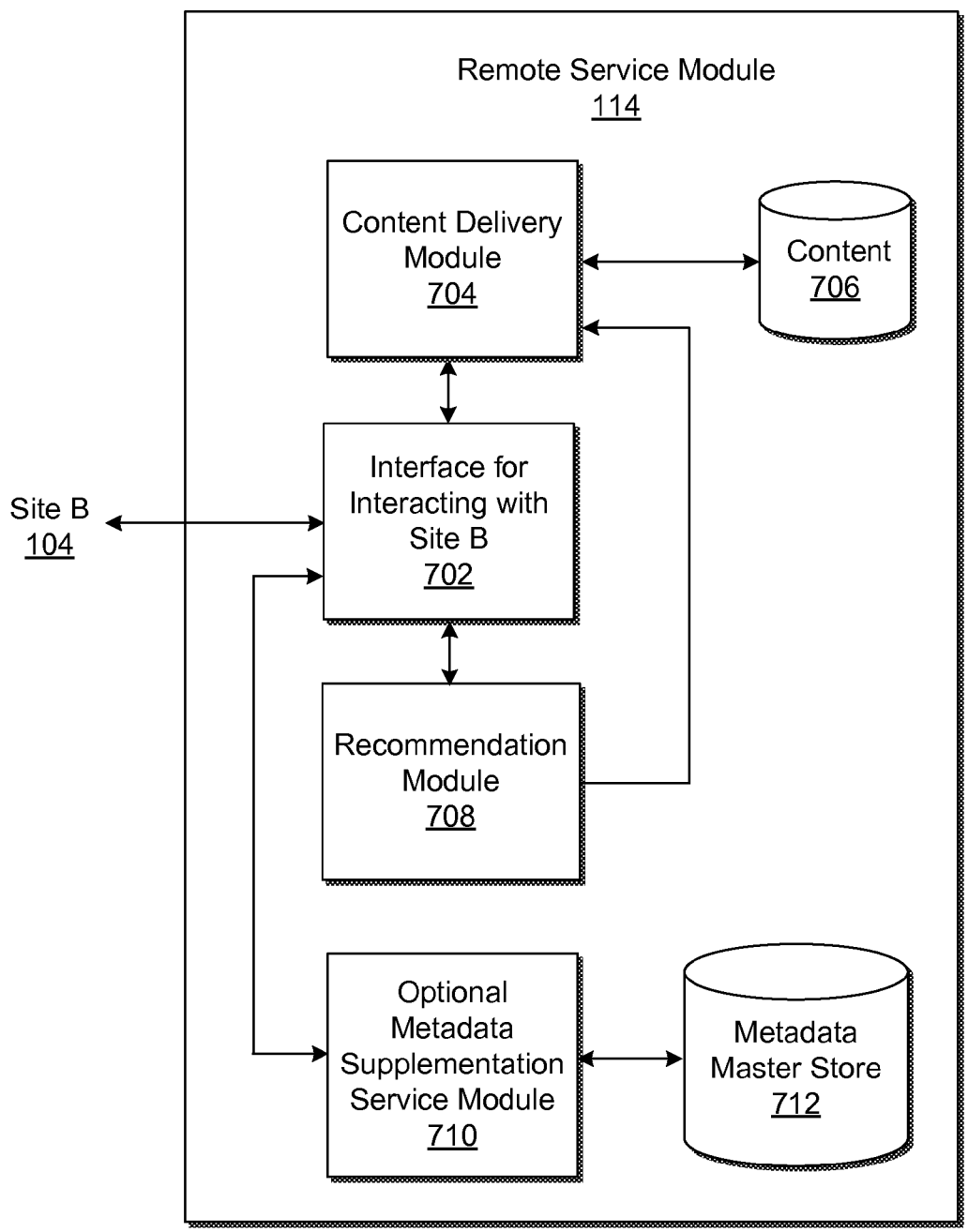
FIG. 7 shows exemplary additional details regarding a remote service module that is used in the system of FIG. 1.

FIG. 7 shows exemplary details of a remote service module 114. In one case, the remote service module 114 can be implemented as one or more server computers and associated databases that are accessible via a wide area network, such as the Internet.

The remote service module 114 includes an interface 702 for interacting with the receiving module 112. This interface 702 can include front-end server communication infrastructure that communicates with the receiving module 112 over a wide area network.

The remote service module 114 also includes a content delivery module 704. The purpose of the content delivery module 704 is to perform any kind of processing of the event metadata received from the receiving module 112 (wherein such processing may be identified by intent data associated with the event metadata). In one case, this processing comprises identifying and accessing content that corresponds to the event metadata. For example, consider the vehicle scenario in which the event metadata corresponds to songs that the user has expressed interest in while driving the vehicle. In this case, the content delivery module 704 correlates the event metadata with the songs associated with the event metadata, and then accesses the song content for delivery to the receiving module 112. The content delivery module 704 can access the content from one or more content stores 706. The content delivery module 704 and the content stores 706 can be maintained and administered by the same commercial entity or by different respective commercial entities.

The remote service module 114 can also include a recommendation module 708. The purpose of the recommendation module is to recommend content to the user based on the user's event metadata. For instance, as explained above, the content delivery module 704 may fetch content X in response to event metadata associated with content X; but the recommendation module 708 may also instruct the content delivery module 704 to fetch content Y in response to event metadata associated with content X because it determines that content Y is related to content X. The recommendation module 702 can make such recommendations on any basis, such as by identifying common characteristics of the content (e.g., a customer who purchases a particular song from artist Z is likely to be interested in other songs from artist Z). Or the recommendation module 702 can make recommendations based on empirical data (e.g., a statistically significant number of customers who purchased song X also purchased song Y).

In one case, the remote service module 114 can deliver the actual content provided by the content delivery module 704 to the receiving module 112. This can comprise, for instance, downloading one or more songs to the receiving module 112. In another application, the remote service module 114 can change the status of content that it maintains such that the receiving module 112 or some other entity is authorized to later download or otherwise access such content when needed.

Finally, the remote service module 114 can include a metadata supplementation service module 710. Alternatively, a separate online service can implement the metadata supplementation service module 710. In any case, this module 710 is used to provide additional event metadata in the case that the delivery module 108 could not supply a complete set of event metadata (at the time of event registration at the first site 102). The metadata supplementation service module 710 can perform this function by interacting with a master metadata store 712. Namely, the metadata supplementation service module 710 can use the provided (but incomplete) event metadata to find the missing event metadata within the master metadata store 712. For example, the delivery module 108 may have logged the title of a particular song, but may not have identified the commercial distributor of this song. The metadata supplementation service module 710 can find out this missing information by using the title of the song as a search term.

It will be appreciated that the remote service module 114 can include many other functions and modules; to facilitate explanation, FIG. 7 focuses on the modules described above which serve a role in the exchange of event metadata and content.

A.7. Processing Functionally

Figure 8:
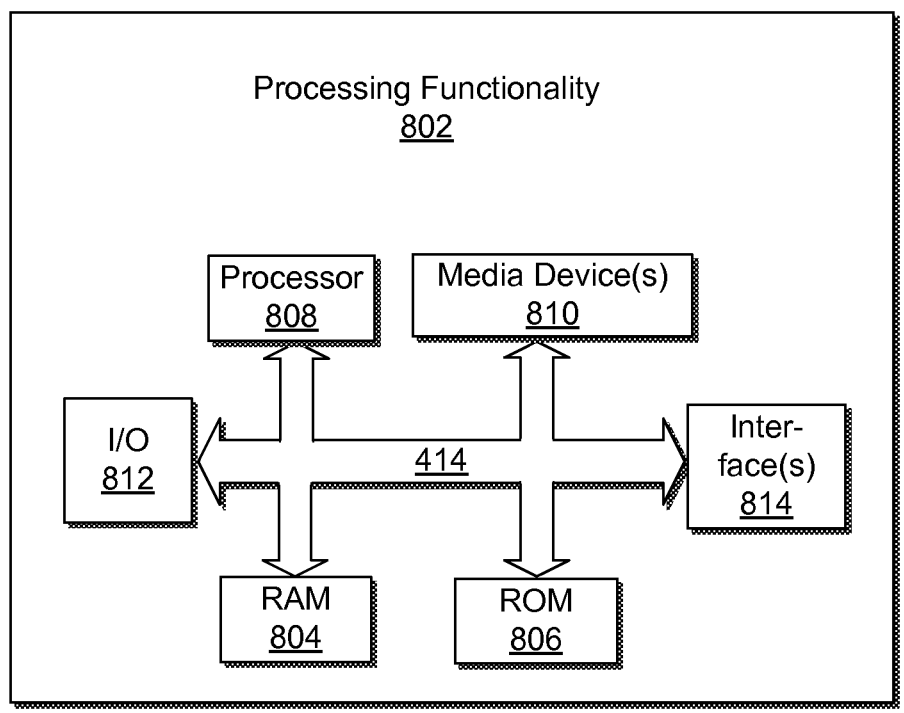
FIG. 8 shows exemplary details regarding processing functionality that can be used to implement any aspect of the system of FIG. 1.

Various components of the system 100 shown in FIG. 1 can be implemented by processing equipment, such as the delivery module 108, the portable module 106, the receiving module 112, and the remote service module 114. FIG. 8 shows a general depiction of processing functionality 802 that can be used to implement any of these processing functions.

The processing functionality 802 can include various volatile and non-volatile memory, such as RAM 804 and ROM 806, as well as one or processing devices 808. The memory (804, 806) can store instructions which perform the various functions described above when executed by the processing devices 808. The processing functionality 802 also optionally includes various media devices 810, such as a hard disk reading and writing module, an optical disk module, and so forth. The processing functionality 802 also includes an input/output module 812 for receiving various inputs from the user (as implemented by a key input mechanism, etc.), and for providing various outputs to the user (as implemented by various display devices, printers, audio output devices, etc.). The process functionality 802 can also include one or more interfaces 814 for exchanging data with other devices.

In various applications, the processing functionality 802 shown in FIG. 8 can include additional modules or can omit one or more of the modules shown in FIG. 8.

B. Exemplary Method of Operation

FIGS. 9-12 describe the operation of the system 100 shown in FIG. 1 in flowchart form. To facilitate discussion, certain operations are described as constituting distinct steps performed in a certain order. Such implementations are exemplary and non-limiting. Certain steps described in these flowcharts can be grouped together and performed in a single operation, and certain steps can be performed in an order that differs from the order shown in the flowcharts. As the functions described in these flowcharts have already been explained in prior sections, Section B will serve primarily as a review of those functions.

B.1. Operation from the Perspective of the User

Figure 9:
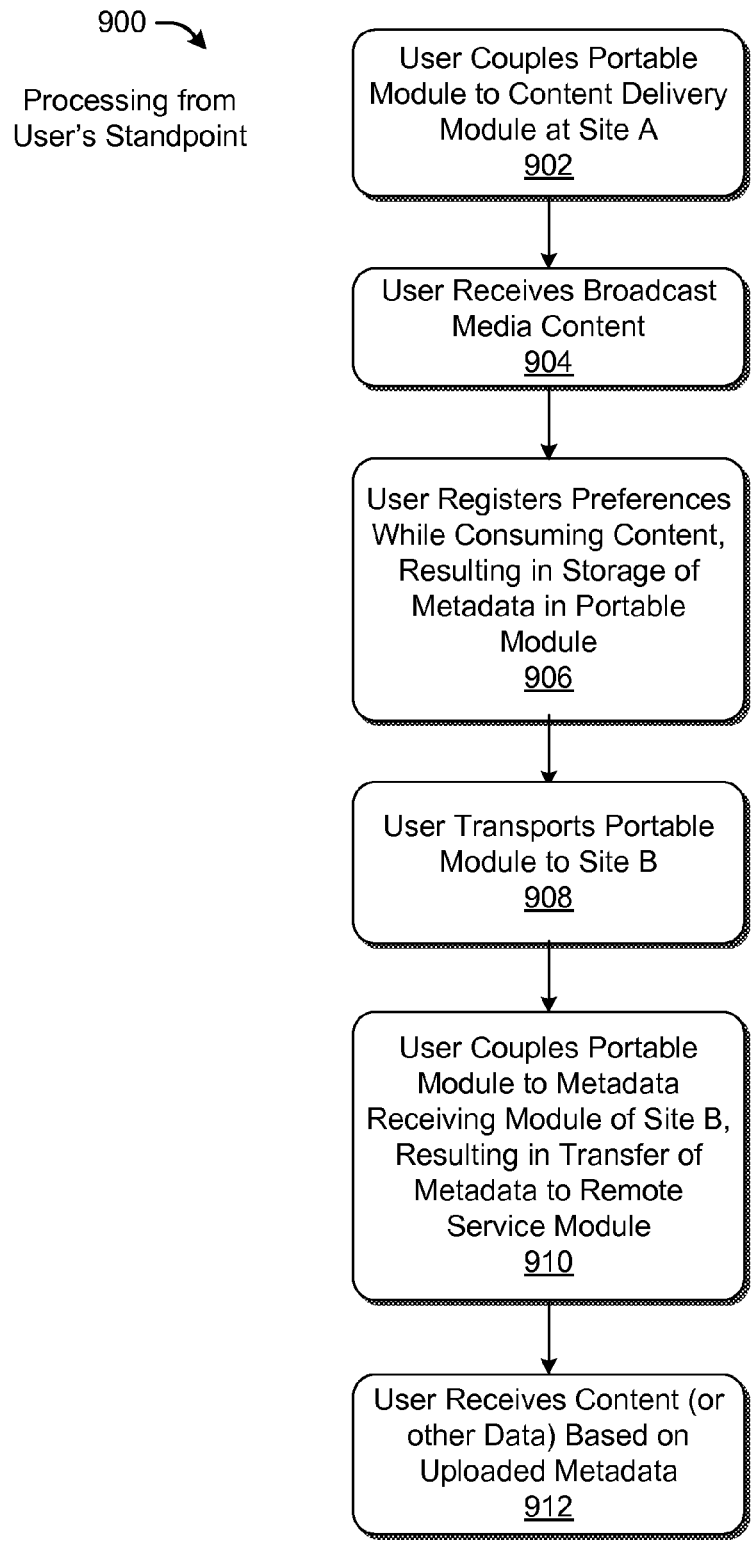
FIG. 9 shows an exemplary operation of the system of FIG. 1 from the standpoint of a user who interacts with the system.

FIG. 9 shows a procedure 900 which explains the operation of the system 100 shown in FIG. 1 from the perspective of the user who interacts with the system 100.

In step 902, the user couples the portable module 106 to the delivery module 108 of site A 102. This can comprise, in the scenario of FIG. 2, coupling a portable media player to a radio device of a vehicle.

In step 904, the user receives content via the delivery module 108 from the remote source 110. This can comprise, in the scenario of FIG. 2, receiving broadcast songs from a broadcast source 210.

In step 906, the user registers his or her interest in content that is being delivered. This can comprise, in the scenario of FIGS. 2 and 4, the user's activation of a button 402 that registers the user's interest in a song that is being broadcast. In addition, intent data (identifying an act that the user wishes to perform on the content) can be registered. In addition, context data (describing the circumstances surrounding the user's selection of content) can be registered. All such data comprises event metadata. In other circumstances, step 906 can involve automatically registering event metadata.

In step 908, in one scenario, the user can transfer the portable module 106 from the delivery module 108 to the receiving module 112. For instance, at the end of a day or week of driving, the user can remove the portable module 106 from the delivery module 108 within the user's vehicle and communicatively couple the portable module 106 to the user's personal computer (which functions as the receiving module 112).

In step 910, the user connects the portable module 106 to the receiving module 112, which results in the transfer of event metadata stored in the portable module to the receiving module 112. The user can optionally inspect a listing of the event metadata that is provided by the receiving module 112, and enter various instructions with respect to the presented event metadata. (Instead of steps 908 and 910, it is also possible to electronically transfer the event metadata from the portable module 106 to the receiving module 112 while the portable module 106 remains coupled to the delivery module 108.)

In step 912, the user optionally can receive content from the receiving module 112 in response to the uploading of event metadata to the receiving module 112. For instance, in the scenario of FIG. 2, this operation can comprise receiving song content corresponding to the music that the user has expressed an interest in while driving his or her vehicle. The content can be obtained from the remote service module 114 in the manner described in Section A. The receiving module 112 can deliver such content to the user for the user's immediate consumption. Or the receiving module 112 can download the content to the portable module 106, whereupon the user can play the content at any other location; in one case, for instance, the user can again couple the portable module 106 to the delivery module 108 in the vehicle to play back the content while driving the vehicle.

Although not shown, the procedure 900 can use the event metadata to perform other operations besides accessing content from the remote service module 114. In one alternative case, the procedure 900 can use the event metadata to organize content or other resources maintained by the receiving module 112 (or other entity).

B.2. Operation from the Perspective of the Delivery Module

Figure 10:
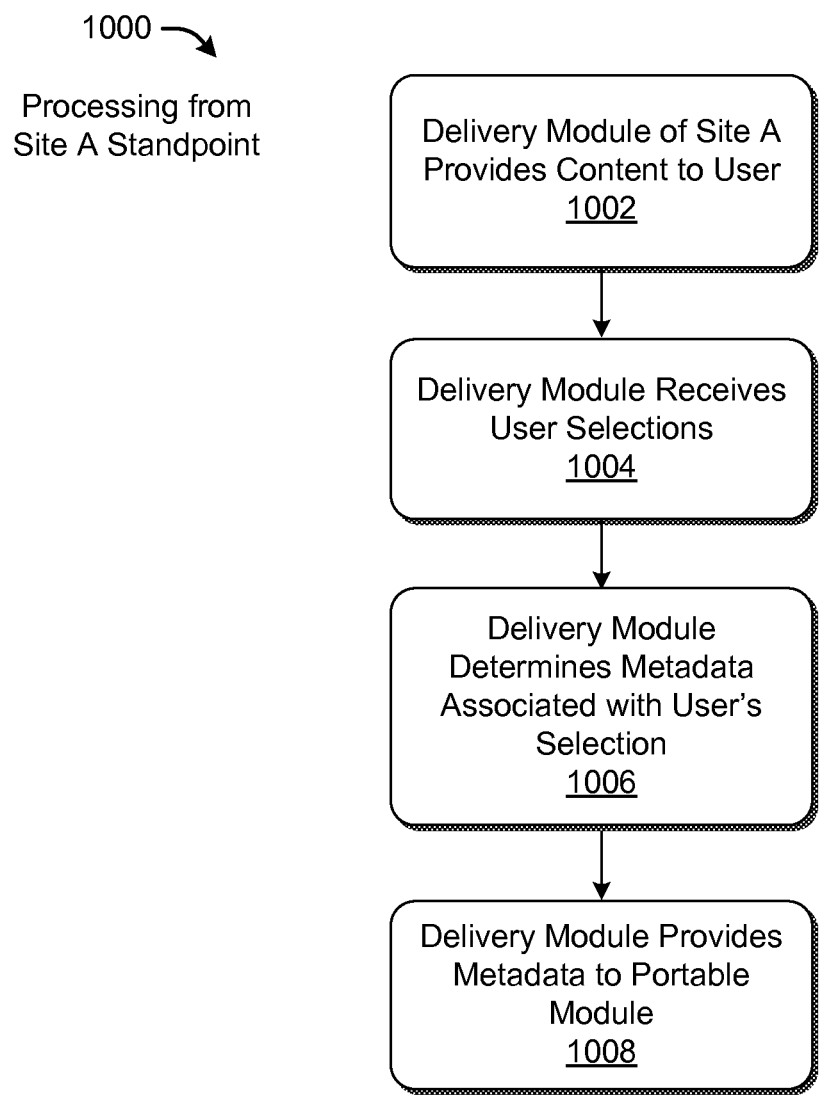
FIG. 10 shows an exemplary operation of the system of FIG. 1 from the standpoint of the delivery module of FIG. 3.

FIG. 10 shows a procedure 1000 which explains the operation of the system 100 shown in FIG. 1 from the standpoint of the delivery module 108.

In step 1002, the delivery module 108 provides content to the user.

In step 1004, the delivery module 108 receives the user's input that expresses the user's interest in part of the delivered content, such as a particular song that is being broadcast. The delivery module 108 can optionally allow the user to register his or her intent with respect to identified content.

In step 1006, the delivery module 108 determines event metadata associated with the user's selections (if not already supplied in the previous step). One component of this event metadata may describe the content item(s) being sought, which defines preference data. Another component of the event metadata may describe the action(s) that the use wishes to perform on the items being sought, which defines intent data. The delivery module 108 can optionally also record context data associated with the context in which the user made his or her selections. Exemplary such contextual metadata describes "where" the user made his or her selections, "when" the user made his or her selections, and so forth.

In step 1008, the delivery module 108 transfers the determined event metadata to the portable module 106.

B.3. Operation from the Perspective of the Receiving Module

Figure 11:
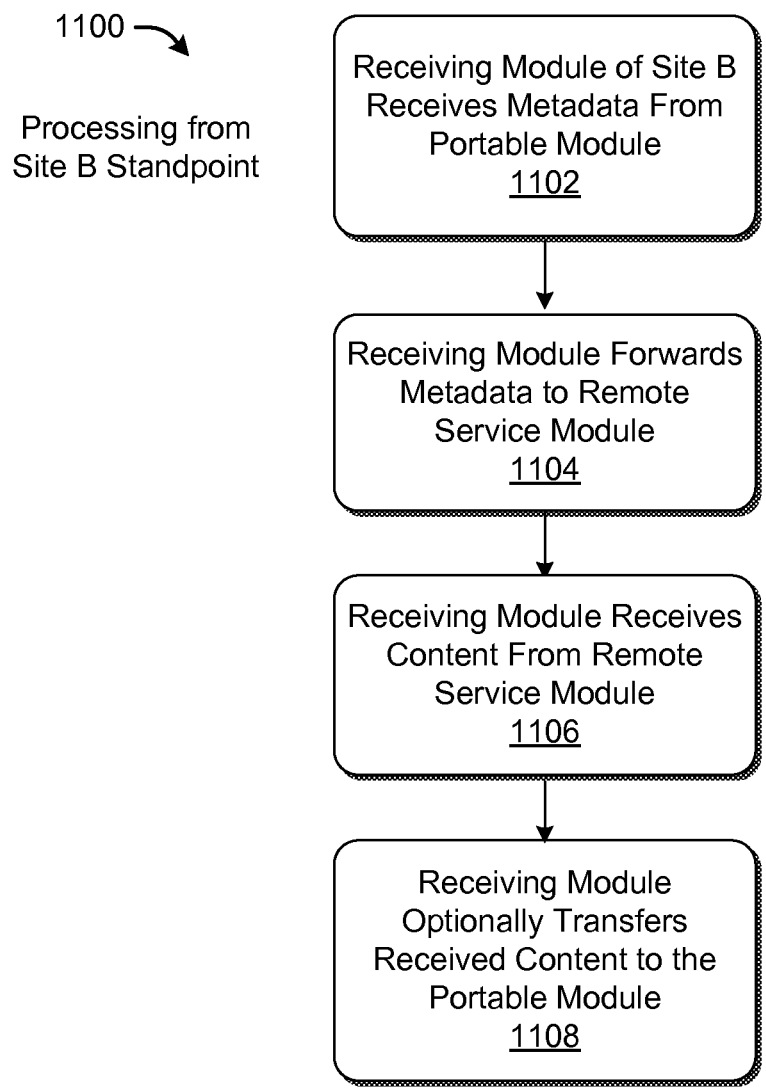
FIG. 11 shows an exemplary operation of the system of FIG. 1 from the standpoint of the receiving module of FIG. 6.

FIG. 11 shows a procedure 1100 which explains the operation of the system 100 shown in FIG. 1 from the standpoint of the receiving module 112.

In step 1102, the receiving module 112 receives event metadata from the portable module 106. Although not shown, the receiving module 112 can optionally display the event metadata to the user for the user's inspection. This presentation also allows the user to enter various instructions with respect to the event metadata.

In step 1104, the receiving module 112 optionally contacts the remote service module 114 and provides the event metadata to the remote service module 114.

In step 1106, the receiving module 112 receives content back from the remote service module 114 or some other response from the remote service module 114.

In step 1108, the receiving module 112 optionally transfers the received content directly to the user (e.g., by playing the content back at the personal computer), or optionally transfers the content to the portable module 106, whereupon it can be played back later from any site.

Although not shown, the user can access a remote service to perform other tasks. For instance, the event metadata received from the portable module 106 may have various omissions; in this case, the receiving module 112 can access a remote service (such as the remote service module 114) to supply the missing event metadata.

B.4. Operation from the Perspective of the Remote Service Module

Figure 12:
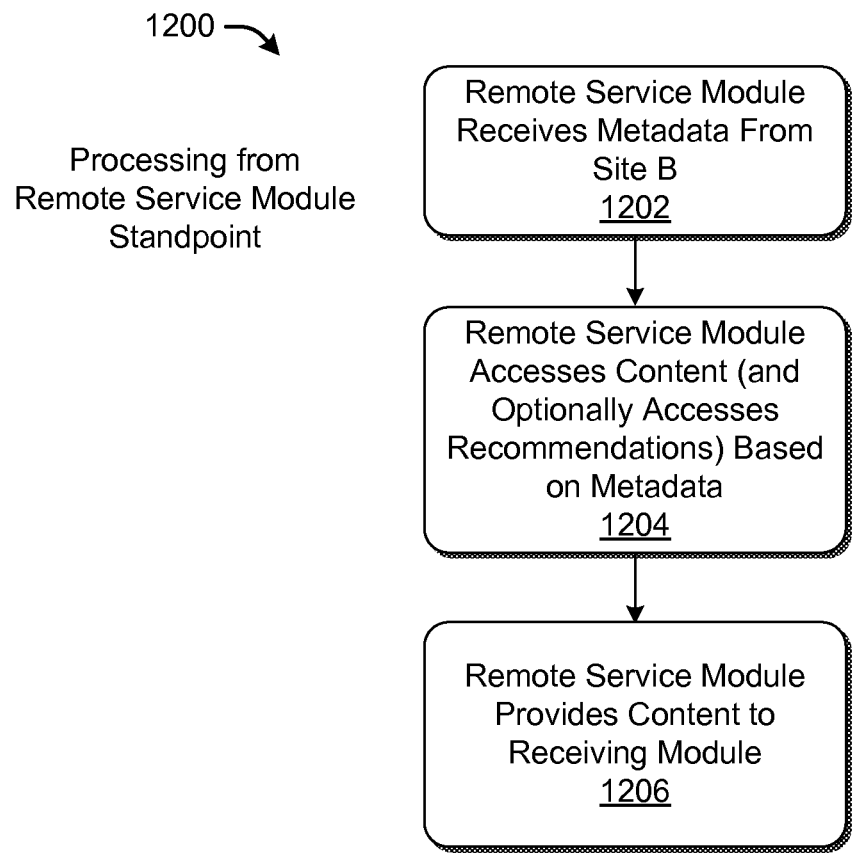
FIG. 12 shows an exemplary operation of the system of FIG. 1 from the standpoint of the remote service module.

FIG. 12 shows a procedure 1200 which explains the operation of the system 100 shown in FIG. 1 from the standpoint of the remote service module 114.

In step 1202, the remote service module 114 receives the event metadata from the receiving module 112.

In step 1204, the remote service module 114 accesses content associated with the event metadata. This content can correspond to the content expressly identified by the event metadata and/or can correspond to recommended content that is related to the content identified by the event metadata.

In step 1206, the remote service 1206 sends the content to the receiving module 112.

The remote service module 114 can perform other functions (not shown), such as supplying missing event metadata in response to queries from the receiving module 112.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method, comprising:
    causing, via a portable device, a user to be exposed to media content via a delivery device, the delivery device being selectively coupled to the portable device;
    receiving, via the portable device, a user actuation that corresponds to at least one user interest associated with the media content;
    registering first event metadata on the portable device based at least in part on the at least one user interest and the media content;
    sending the first event metadata to a remote server device;
    receiving, from the remote server device, processed event metadata that identifies one or more items that relate to the at least one user interest and the media content, the processed event metadata including first processed metadata associated with the first event metadata and second processed event metadata based at least in part on the at least one user interest and the media content, wherein the second processed event metadata is received by the remote server device from a supplemental service server; and
    receiving, at the portable device, the one or more items.

2. The method as recited in claim 1, wherein the first event metadata includes preference data that identifies the one or more items associated with the media content.

3. The method as recited in claim 1, wherein the first event metadata includes intent data that reflects user instructions to perform an action associated with the media content.

4. The method as recited in claim 1, wherein the first event metadata includes context data regarding circumstances surrounding a user actuation associated with the media content.

5. The method as recited in claim 1, further comprising receiving, at the portable device, one or more recommendations for additional media content based at least in part on the processed event metadata.

6. The method as recited in claim 5, wherein the first event metadata is processed to retrieve the media content and the one or more recommendations for the additional media content.

7. The method as recited in claim 1, wherein the at least one user interest associated with the media content corresponds to a place or an event, and wherein the one or more items transmitted to the portable device includes information associated with the place or the event.

8. A computer-readable storage device having stored thereupon computer-executable instructions that, when executed by one or more processors, cause the one or more processors to perform operations comprising:
    receiving an indication of broadcast media content that is exposed through a first device from a first media source;
    receiving, via the first device, an indication of a user actuation relating to at least one user interest associated with the broadcast media content;
    based at least partly on the user actuation, registering first event metadata relating to the at least one user interest, the first event metadata identifying a portion of the broadcast media content being broadcast at a time of the user actuation;
    transmitting, the first event metadata to a remote server device to identify one or more items that relate to the at least one user interest and the broadcast media content, the remote server device identifying the one or more items by processing the first event metadata and second event metadata based at least in part on the at least one user interest and the media content, wherein the second processed event metadata is received by the remote server device from a supplemental service server; and
    receiving, from the remote server device, the one or more items at a second device that is physically different and separate from the first device.

9. The computer-readable storage device as recited in claim 8, wherein the one or more items comprise one or more recommendations of additional media content items based at least in part on one of the first event metadata or the second event metadata.

10. The computer-readable storage device as recited in claim 8, wherein the user actuation is in response to the broadcast media content being transmitted through the first device.

11. The computer-readable storage device as recited in claim 8, wherein the user actuation is associated with a profile criteria that is pre- registered by a user.

12. The computer-readable storage device as recited in claim 8, wherein the first device is a first media player, the second device is a second media player, and the first media source is a first server device.

13. A computer-readable storage device having stored thereupon computer-executable instructions that, when executed by one or more processors, cause the one or more processors to perform operations comprising:
    causing, via a portable device, a user to be exposed to media content via a delivery device, the delivery device being selectively coupled to the portable device associated with the user;
    receiving, via the portable device, a user actuation that corresponds to at least one user interest associated with the media content;
    registering first event metadata on the portable device while the media content is being presented via the delivery device, the first event metadata based at least in part on the at least one user interest and the media content;
    uploading the first event metadata from the portable device to a remote server, the remote server to process the first event metadata and second event metadata to generate processed event metadata and to further identify one or more items that relate to the at least one user interest and the media content based at least in part on the processed event metadata, the second event metadata being received from a supplemental service server and being based at least in part on the at least one user interest and the media content;
    receiving, from the remote server, the one or more items; and
    transmitting the one or more items to the portable device.

14. The computer-readable storage device as recited in claim 13, wherein the first event metadata includes preference data that corresponds to the at least one user interest associated with the media content.

15. The computer-readable storage device as recited in claim 13, wherein the first event metadata includes intent data that reflects user instructions to perform an action associated with the media content.

16. The computer-readable storage device as recited in claim 13, wherein the first event metadata includes context data regarding circumstances surrounding a user actuation associated with the media content.

17. The computer-readable storage device as recited in claim 16, wherein the user actuation is associated with a profile criteria that is pre- registered by the user.

18. The computer-readable storage device as recited in claim 13, wherein the one or more items comprise recommendations for additional media content.

19. The computer-readable storage device as recited in claim 13, wherein the first event metadata and the second event metadata is processed to retrieve the media content and the one or more items.

\* \* \* \* \*